(12) United States Patent
Park et al.

(10) Patent No.: US 9,438,927 B2
(45) Date of Patent: Sep. 6, 2016

(54) APPARATUS AND METHOD FOR MOTION ESTIMATION FOR VARIABLE BLOCK SIZES

(71) Applicant: ELECTRONICS AND TELECOMMUNICATIONS RESEARCH INSTITUTE, Daejeon (KR)

(72) Inventors: Seong-Mo Park, Daejeon (KR); Kyung-Jin Byun, Daejeon (KR); Nak-Woong Eum, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 337 days.

(21) Appl. No.: 14/218,488

(22) Filed: Mar. 18, 2014

(65) Prior Publication Data
US 2014/0307794 A1    Oct. 16, 2014

(30) Foreign Application Priority Data

Apr. 11, 2013   (KR) .................. 10-2013-0040091

(51) Int. Cl.
*H04N 19/52* (2014.01)
*H04N 19/42* (2014.01)
*H04N 19/436* (2014.01)

(52) U.S. Cl.
CPC ............. *H04N 19/52* (2014.11); *H04N 19/42* (2014.11); *H04N 19/436* (2014.11)

(58) Field of Classification Search
None
See application file for complete search history.

(56) References Cited

U.S. PATENT DOCUMENTS

| 6,907,074 | B2 |  | 6/2005 | Park et al. |
| 8,432,970 | B1 | * | 4/2013 | Cahalan ................. H04N 19/56 375/240.16 |
| 8,731,059 | B2 |  | 5/2014 | Yang et al. |
| 2008/0292001 | A1 | * | 11/2008 | Yang ................ H04N 19/00521 375/240.16 |
| 2013/0016787 | A1 | * | 1/2013 | Kim ..................... H04N 19/176 375/240.16 |

FOREIGN PATENT DOCUMENTS

| KR | 10-2008-0102947 | 11/2008 |
| KR | 10-2009-0079286 | 7/2009 |

OTHER PUBLICATIONS

Sukho Lee et al., "270 MHz Full HD H.264/AVC High Profile Encoder with Shared Multibank Memory-based Fast Motion Estimation ," ETRI Journal, vol. 31, No. 6, Dec. 2009.

\* cited by examiner

*Primary Examiner* — William C Vaughn, Jr.
*Assistant Examiner* — Lindsay Uhl
(74) *Attorney, Agent, or Firm* — Kile Park Reed & Houtteman PLLC

(57) ABSTRACT

A motion estimation apparatus and method are disclosed. The motion estimation apparatus includes processing element (PE) array units, sub-SAD calculation units, motion vector calculation units, and a minimum motion vector selector. The PE array units each perform parallel processing for each of the three types of coding units. The sub-SAD calculation units calculate respective SAD values for the three types of coding units. The motion vector calculation units calculate respective motion vectors for the three types of coding units. The minimum motion vector selector selects a minimum motion vector from among the motion vectors.

6 Claims, 10 Drawing Sheets

| Time | R | S0 | S1 | PE0 | PE1 | PE2 | ... | PE15 |
|---|---|---|---|---|---|---|---|---|
| 0 | r(0,0) | s(0,0) | | \|r(0,0)-s(0,0)\| | | | | |
| 1 | r(0,1) | s(0,1) | | \|r(0,0)-s(0,1)\| | \|r(0,1)-s(0,1)\| | | | |
| 2 | r(0,2) | s(0,2) | | \|r(0,0)-s(0,2)\| | \|r(0,1)-s(0,2)\| | \|r(0,2)-s(0,2)\| | | |
| | | | | | | | | |
| | | | | | | | | |
| 14 | r(0,14) | s(0,14) | | \|r(0,0)-s(0,14)\| | | | | |
| 15 | r(0,15) | s(0,15) | | \|r(0,0)-s(0,15)\| | \|r(0,1)-s(0,15)\| | | | \|r(0,15)-s(0,15)\| |
| 16+0 | | s(0,16) | | \|r(0,0)-s(0,16)\| | \|r(0,1)-s(0,16)\| | \|r(0,2)-s(0,16)\| | | \|r(0,15)-s(0,16)\| |
| 16+1 | | s(0,17) | | \|r(0,0)-s(0,17)\| | \|r(0,1)-s(0,17)\| | \|r(0,2)-s(0,17)\| | | |
| | | | | \|r(0,0)-s(0,18)\| | | \|r(0,2)-s(0,18)\| | | |
| | | | | | | | | \|r(0,15)-s(0,30)\| |
| 16+15 | | s(0,31) | | \|r(0,0)-s(0,31)\| | | | | \|r(0,15)-s(0,31)\| |
| 2x16+0 | r(1,0) | s(0,32) | s(1,0) | \|r(1,0)-s(1,0)\| | \|r(0,1)-s(0,32)\| | | | \|r(0,15)-s(0,32)\| |
| 2x16+1 | r(1,1) | s(0,33) | s(1,1) | \|r(1,0)-s(1,1)\| | \|r(1,1)-s(1,1)\| | \|r(0,2)-s(0,33)\| | | |
| | | | | | | \|r(1,2)-s(1,2)\| | | |
| | | | | | | | | \|r(0,15)-s(0,46)\| |
| 2x16+14 | r(1,14) | s(0,46) | s(1,14) | | | | | \|r(1,15)-s(1,15)\| |
| 2x16+15 | r(1,15) | | s(1,15) | \|r(1,0)-s(1,15)\| | \|r(1,1)-s(1,15)\| | | | |
| | | | | | \|r(1,1)-s(1,16)\| | | | |
| | | | | | | \|r(1,2)-s(1,17)\| | | |
| | | | | | | | | |
| | | | | | | | | |
| 29x16+15 | | s(14,31) | | | | | | |
| 30x16+0 | r(15,0) | s(14,32) | s(15,0) | \|r(15,0)-s(15,0)\| | \|r(14,1)-s(14,32)\| | | | |
| 30x16+1 | r(15,1) | s(14,33) | s(15,1) | \|r(15,0)-s(15,1)\| | \|r(15,1)-s(15,1)\| | \|r(14,2)-s(14,33)\| | | |
| | | | | | | \|r(15,2)-s(15,2)\| | | |
| | | | | | | | | \|r(14,15)-s(14,46)\| |
| 30x16+15 | r(15,15) | | s(15,15) | \|r(15,0)-s(15,15)\| | | | | \|r(15,15)-s(15,15)\| |
| 31x16+0 | | | s(15,16) | \|r(15,0)-s(15,16)\| | \|r(15,1)-s(15,16)\| | | | \|r(15,15)-s(15,16)\| |
| | | | | | \|r(15,1)-s(15,17)\| | \|r(15,2)-s(15,17)\| | | |
| | | | | | | \|r(15,2)-s(15,18)\| | | |
| | | | | | | | | |
| 31x16+15 | | | s(15,31) | \|r(15,0)-s(15,31)\| | | | | \|r(15,15)-s(15,31)\| |
| 32x16+0 | r(0,0) | s(1,0) | s(15,32) | \|r(0,0)-s(1,0)\| | \|r(15,1)-s(15,32)\| | | | |
| 32x16+1 | r(0,1) | s(1,2) | s(15,33) | \|r(0,0)-s(1,1)\| | \|r(0,1)-s(1,1)\| | \|r(15,2)-s(15,32)\| | | |
| | | | | | | \|r(0,2)-s(1,2)\| | | |
| | | | | | | | | |
| | | s(1,14) | s(15,46) | \|r(0,0)-s(1,14)\| | | | | \|r(15,15)-s(15,46)\| |
| 32x16+15 | r(0,15) | s(1,15) | | \|r(0,0)-s(1,15)\| | | | | \|r(0,15)-s(1,15)\| |

FIG. 5

CURRENT IMAGE DATA MEMORY
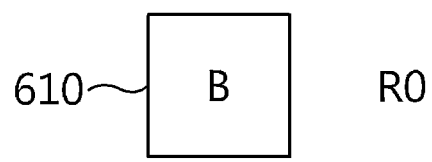
SEARCH REGION DATA MEMORY
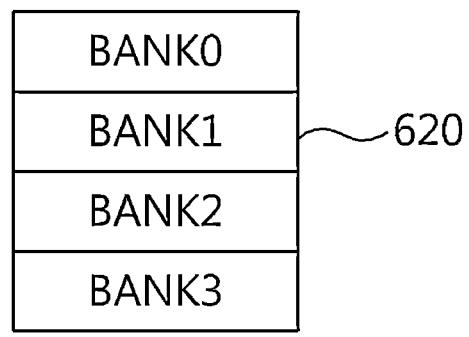
FIG. 6

APPARATUS AND METHOD FOR MOTION ESTIMATION FOR VARIABLE BLOCK SIZES

CROSS REFERENCE TO RELATED APPLICATION

This application claims the benefit of Korean Patent Application No. 10-2013-0040091, filed on Apr. 11, 2013, which is hereby incorporated by reference in its entirety into this application.

BACKGROUND OF THE INVENTION

1. Technical Field

The present invention relates generally to motion estimation technology and, more particularly, to motion estimation technology that, in order to process various block sizes using only minimum hardware in a parallel processing manner, classifies block sizes into three groups and then performs the parallel processing of each of the groups using common hardware.

2. Description of the Related Art

The ISO/IEC Moving Picture Experts Group (MPEG) and the ITU-T Video Coding Experts Group (VCEG), which developed the H.264/AVC standard, established the Joint Collaborative Team on Video Coding (JCT-VC). The JCT-VC is currently developing the High Efficiency Video Coding (HEVC) standard, which is a next-generation multimedia moving image compression standard. The HEVC standard is being developed with the principal technical aim of the achievement of the high compression ratio of the H.264 standard, and further with the ultimate aim of the implementation of a general-purpose moving image coding technology that can be used in almost all transmission media, such as storage media, the Internet and satellite broadcasting, and various moving image resolution environments.

When a System on Chip (SoC) based the HEVC standard, which is a multimedia moving image compression standard, is implemented, complexity increases in proportion to an increase in resolution. In particular, since a motion estimation block has the highest computational load among HEVC component blocks and the HEVC standard supports motion estimation for various-sized blocks, it has become a very important issue to more efficiently implement a motion estimation block.

Korean Patent Application Publication No. 2009-0079286 discloses a technology that, in order to perform pixel-based matching sequentially from the least frequent pixel in a current macroblock, obtains the partial sum of absolute differences (SAD) for each preset number of pixels of a candidate macro-block and then determines whether to early determinate the corresponding candidate macroblock by comparing the partial SAD with the minimum SAD.

However, Korean Patent Application Publication No. 2009-0079286 is not directed to a technology that supports all 12 block sizes, that is, 64×64, 64×32, 32×64, 32×32, 32×16, 16×32, 16×16, 16×8, 8×16, 8×8, 4×8 and 8×4 block sizes, supported in the HEVC standard, and is directed to a technology that is not related to parallel processing for various block sizes.

As a result, there is an urgent need for a new motion estimation technology that is capable of supporting all larger coding units (LCUs) suitable for HEVC-based motion estimation and performing appropriate parallel processing.

SUMMARY OF THE INVENTION

Accordingly, the present invention has been made keeping in mind the above problems occurring in the conventional art, and an object of the present invention is to provide a motion estimation technology that can support all block sizes supported in the HEVC standard and perform parallel processing and hardware sharing for various block sizes.

Furthermore, another object of the present invention is to provide a motion estimation technology that alternatively receives an odd current data input and an even current data input so that, upon motion estimation, internal processing speed is twice data input speed.

In accordance with an aspect of the present invention, there is provided a motion estimation apparatus, including processing element (PE) array unit configured to perform parallel processing for each of the three types of coding units; sub-SAD calculation unit configured to calculate respective SAD values for the three types of coding units; motion vector calculation unit configured to calculate respective motion vectors for the three types of coding units; and a minimum motion vector selector configured to select a minimum motion vector from among the motion vectors.

The three types of coding units may include an N×N block type including 64×64, 32×32, 16×16, and 8×8 block sizes, a 2N×N block type including 64×32, 32×16, 16×8, and 8×4 block sizes, and an N×2N block type including 32×64, 16×32, 8×16, and 4×8 block sizes, and the motion estimation apparatus may support 12 block sizes that are supported in an HEVC standard.

The processing of four block sizes corresponding to each of the three types of coding units may be performed with hardware shared.

The PE array unit may include an N×N PE array, a 2N×N PE array, and an N×2N PE array.

The sub-SAD calculation unit may include an N×N sub-SAD calculator, a 2N×N sub-SAD calculator, and an N×2N sub-SAD calculator.

The N×N PE array, the 2N×N PE array and the N×2N PE array may include 16 processing elements (PEs).

The each of PEs alternatively may receive an odd current data input and an even current data input so that internal processing speed is twice data input speed.

The motion estimation apparatus may further include current image storage memory configured to store a current image; previous image storage memory configured to store a previous image; and an address generator configured to generate a memory address required for motion estimation in response to control of a control unit.

In accordance with an aspect of the present invention, there is provided a motion estimation method, including calculating respective SAD values for three types of coding units by performing parallel processing for each of the three types of coding units; calculating respective motion vectors for the three types of coding units; and selecting a minimum motion vector from among the motion vectors.

The three types of coding units may include an N×N block type including 64×64, 32×32, 16×16, and 8×8 block sizes, a 2N×N block type including 64×32, 32×16, 16×8, and 8×4 block sizes, and an N×2N block type including 32×64, 16×32, 8×16, and 4×8 block sizes, and the motion estimation method may support 12 block sizes that are supported in an HEVC standard.

The processing of four block sizes corresponding to each of the three types of coding units may be performed with hardware shared.

Calculating the SAD values may be performed using PEs, each of which alternatively receives an odd current data input and an even current data input so that internal processing speed is twice data input speed.

BRIEF DESCRIPTION OF THE DRAWINGS

The above and other objects, features and advantages of the present invention will be more clearly understood from the following detailed description taken in conjunction with the accompanying drawings, in which:

FIG. 5 is a diagram illustrating the data flow of the PE illustrated in FIG. 3.

FIG. 6 is a diagram illustrating an example of a memory map;

DESCRIPTION OF THE PREFERRED EMBODIMENTS

Figure 1:
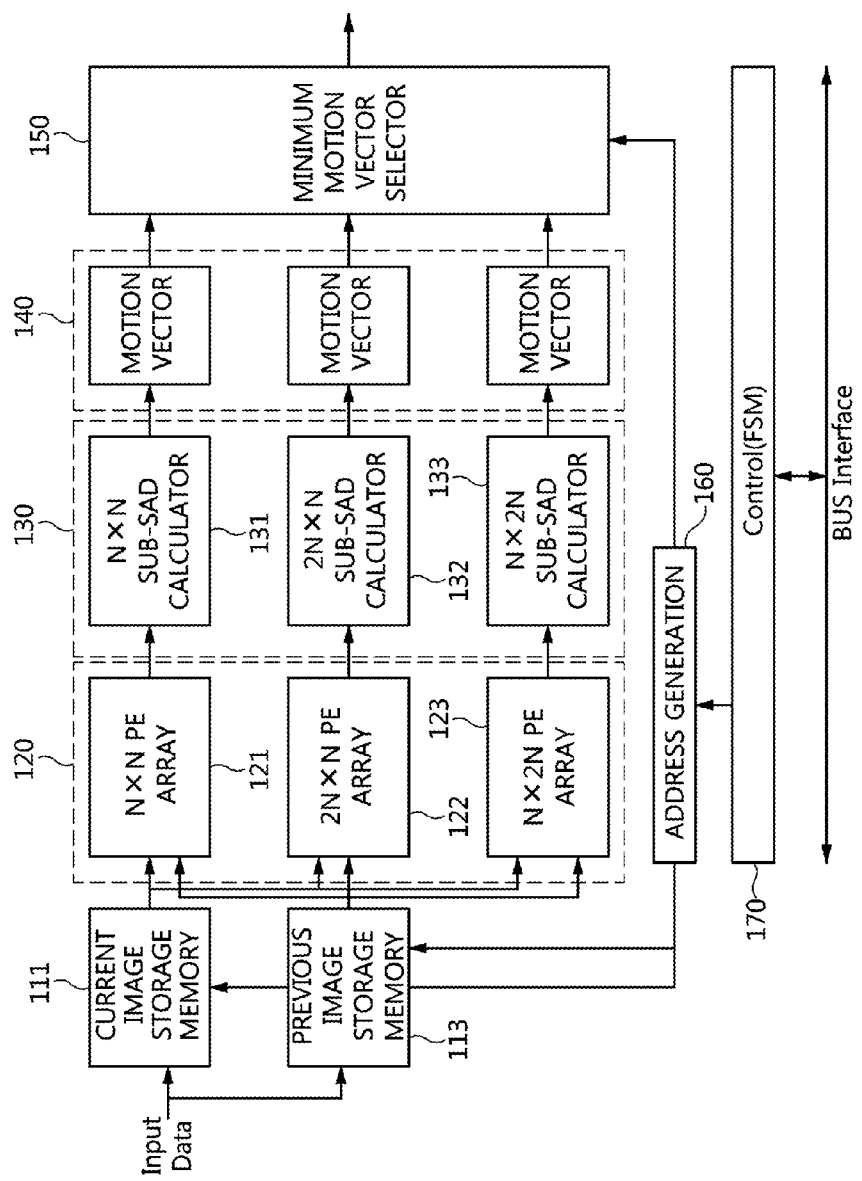
FIG. 1 is a block diagram of a motion estimation apparatus according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

Embodiments of the present invention will be described with reference to the accompanying drawings described in detail.

FIG. 1 is a block diagram of a motion estimation apparatus according to an embodiment of the present invention.

Referring to FIG. 1, the motion estimation apparatus according to an embodiment of the present invention includes current image storage memory 111, previous image storage memory 113, a PE array unit 120, a sub sum of absolute differences (SAD) calculation unit 130, a motion vector calculation unit 140, a minimum motion vector selector 150, an address generator 160, and a controller 170.

The current image storage memory 111 stores a current image.

The previous image storage memory 113 stores a previous image.

The PE array unit 120 includes an N×N PE array 121, a 2N×N PE array 122, and an N×2N PE array 123. That is, to support 12 coding units, that is, 64×64, 64×32, 32×64, 32×32, 32×16, 16×32, 16×16, 16×8, 8×16, 8×8, 4×8, and 8×4 coding units, provided in the HEVC standard, the present invention is configured to classify the coding units into a first group (an N×N group including 64×64, 32×32, 16×16, and 8×8 coding units), a second group (a 2N×N group including 64×32, 32×16, 16×8, and 8×4 coding units), and a third group (an N×2N group including 32×64, 16×32, 8×16, and 4×8 coding units) and to maximize performance through parallel processing for each of the groups. That is, the N×N PE array 121, the 2N×N PE array 122 and the N×2N PE array 123 perform simultaneous operations. The results of the parallel processing are used to calculate a final SAD and a motion vector at a comparator in a final stage.

The N×N PE array 121, the 2N×N PE array 122 and the N×2N PE array 123 perform operations corresponding to the N×N, 2N×N, and N×2N coding units, respectively.

The sub-SAD calculation unit 130 includes an N×N sub-SAD calculator 131, a 2N×N sub-SAD calculator 132, and an N×2N sub-SAD calculator 133.

The N×N sub-SAD calculator 131, the 2N×N sub-SAD calculator 132, and the N×2N sub-SAD calculator 133 may perform pieces of sub-processing corresponding to N×N, 2N×N, and N×2N coding units, respectively. For example, the pieces of sub-processing may be sum of absolute differences (SAD) operations corresponding to N×N, 2N×N or N×2N coding units.

The motion vector calculation unit 140 calculates motion vectors corresponding to N×N, 2N×N and N×2N coding units.

The minimum motion vector selector 150 selects a minimum motion vector from among the motion vectors calculated by the motion vector calculation unit 140.

The address generator 160 generates a memory address required for motion estimation under the control of the control unit 170.

Figure 2:
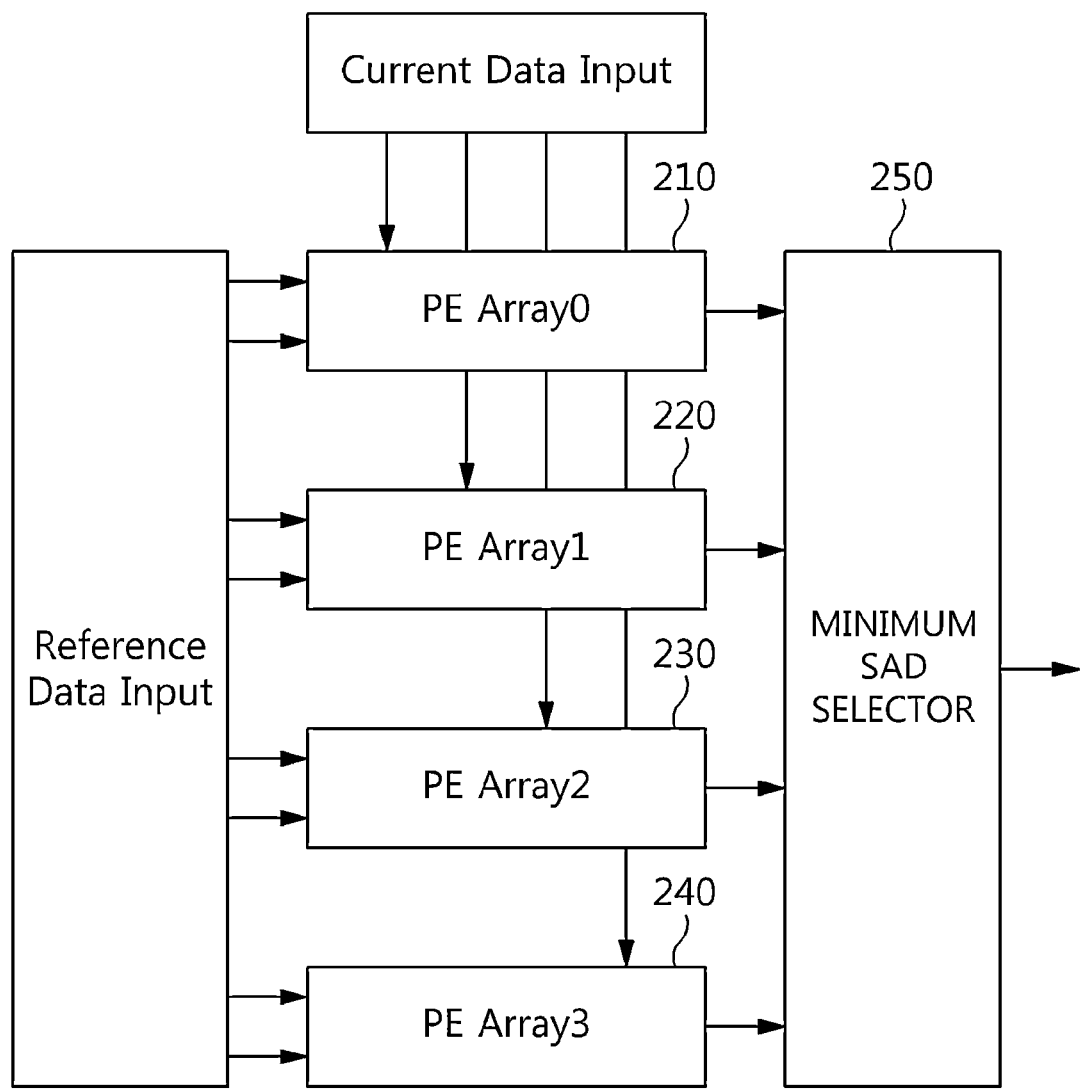
FIG. 2 is a block diagram of an implementation corresponding to the N×N, 2N×N and N×2N PE arrays illustrated in FIG. 1.

FIG. 2 is a block diagram of an implementation corresponding to the N×N, 2N×N and N×2N PE arrays illustrated in FIG. 1. In particular, the block diagram illustrated in FIG. 2 may correspond to the N×N PE array.

Referring to FIG. 2, the PE array may include four PE arrays 210, 220, 230 and 240 and a minimum SAD selector 250.

Each of the four PE arrays 210, 220, 230 and 240 receives a current image and a previous image, and then performs the processing of the images.

The minimum SAD selector 250 receives the output of the PE arrays 210, 220, 230, 240, and selects and outputs a minimum SAD.

Figure 3:
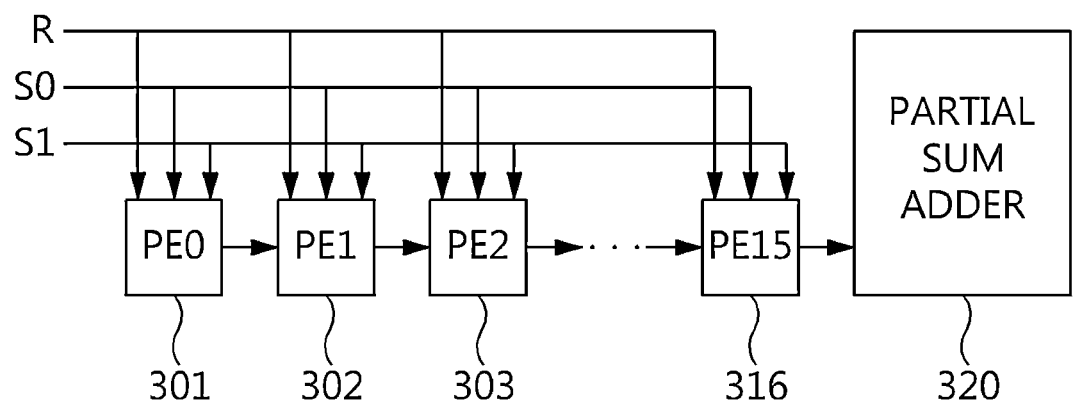
FIG. 3 is a block diagram of an example of the PE array illustrated in FIG. 2.

FIG. 3 is a block diagram of an example of the PE array illustrated in FIG. 2.

Referring to FIG. 3, the PE array includes 16 PEs 301, 302, 303, . . . , and 316 and a partial sum adder 320.

The PEs 301, 302, 303, . . . , and 316 receive current data inputs S0 and S1 and a previous data input R.

It can be seen that the structure illustrated in FIG. 3 is a structure in which half of memory is used in a structure using a semi-systolic array.

That is, the structure illustrated in FIG. 3 is configured such that two current image-related PE array inputs are employed, so that an odd input and an even input are alternatively performed, thereby enabling internal processing speed to be twice data input speed. Furthermore, the structure illustrated in FIG. 3 has 100% processing efficiency all the time except the time during which an initial value is set.

The partial sum calculator 320 receives individual inputs, and calculates the SAD.

Figure 4:
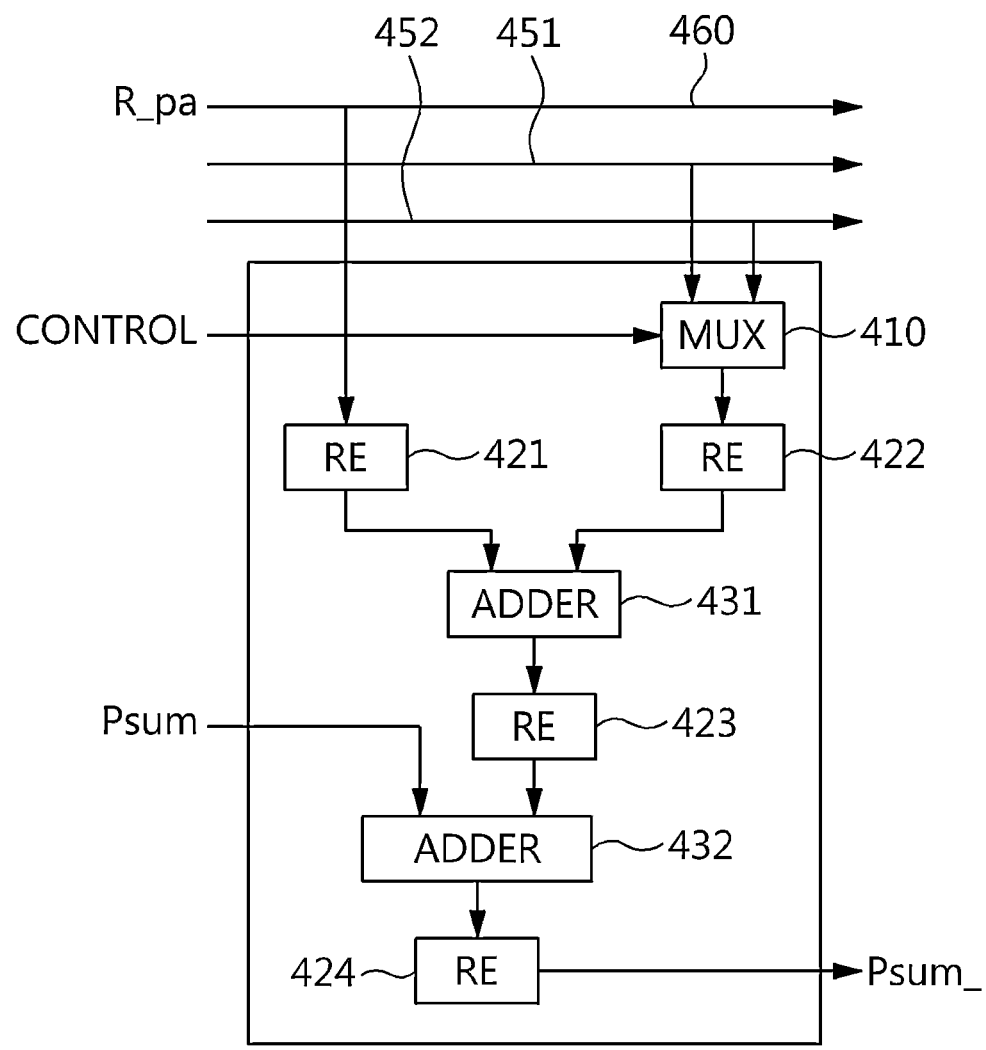
FIG. 4 is a block diagram of an example of each of the PEs illustrated in FIG. 3.

FIG. 4 is a block diagram of an example of each of the PEs illustrated in FIG. 3.

Referring to FIG. 4, the PE includes a multiplexer 410, registers 421, 422, 423, 424 and 425, and adders 431 and 432.

The multiplexer 410 selects one of two current data inputs 451 and 452 in response to a control signal CONTROL. In this case, the input 451 may be odd current image data, and the input 452 may be even current image data.

The register 421 stores previous data input 460.

The register 422 stores the output of the multiplexer 410.

The adder 431 receives the outputs of the registers 421 and 422, and outputs the result of addition.

The register 423 stores the output of the adder 431.

The adder 432 receives a partial sum result Psum obtained in a previous stage and the output of the register 423, and outputs the result of addition.

The register 424 stores the output of the adder 432, and outputs the partial sum result Psum to a subsequent stage.

$$T_{slice} = T_{init} + T_{SAD'}$$

$$T_{SAD'} = T_{row} \times N \quad (1)$$

In Equation 1, $T_{init}$ is 16, and is the time during which initialization for operation is performed as first 16 pieces of reference block data are stored in respective calculators. $T_{SAD'}$ is the time up to the time at which a partial sum is output from the last calculator in a single search region slice, and $T_{row}$ is 32 and is the number of candidate blocks that are simultaneously calculated when a single search region data row is input. Furthermore, N is 16, and is the number of reference block rows. The total time required for a single reference block in Equation 1 is expressed by the following Equation 2:

$$T_{block} = T_{init} + (T_{SAD'} \times SR) \quad (2)$$

In Equation 2, the SR (search range) is the size of a search range, and is equal to the number of search region slices. For example, SR may be 32.

In the above Equations, the time required for a 2:1 sub-sampling algorithm having a 16×16 reference block and a search range of −16 to 15 is $T_{block}$=16+(16×16)×16=4112 cycles. FIG. 5 is a diagram illustrating the timing operation of the PE illustrated in FIG. 3.

FIG. 6 is a diagram illustrating an example of a memory map.

Referring to FIG. 6, it can be seen that a current image data memory 610 and a search region data memory 620 have been provided.

In particular, the search region data memory 620 enables a previous image to be simultaneously input using four banks.

Figure 7:
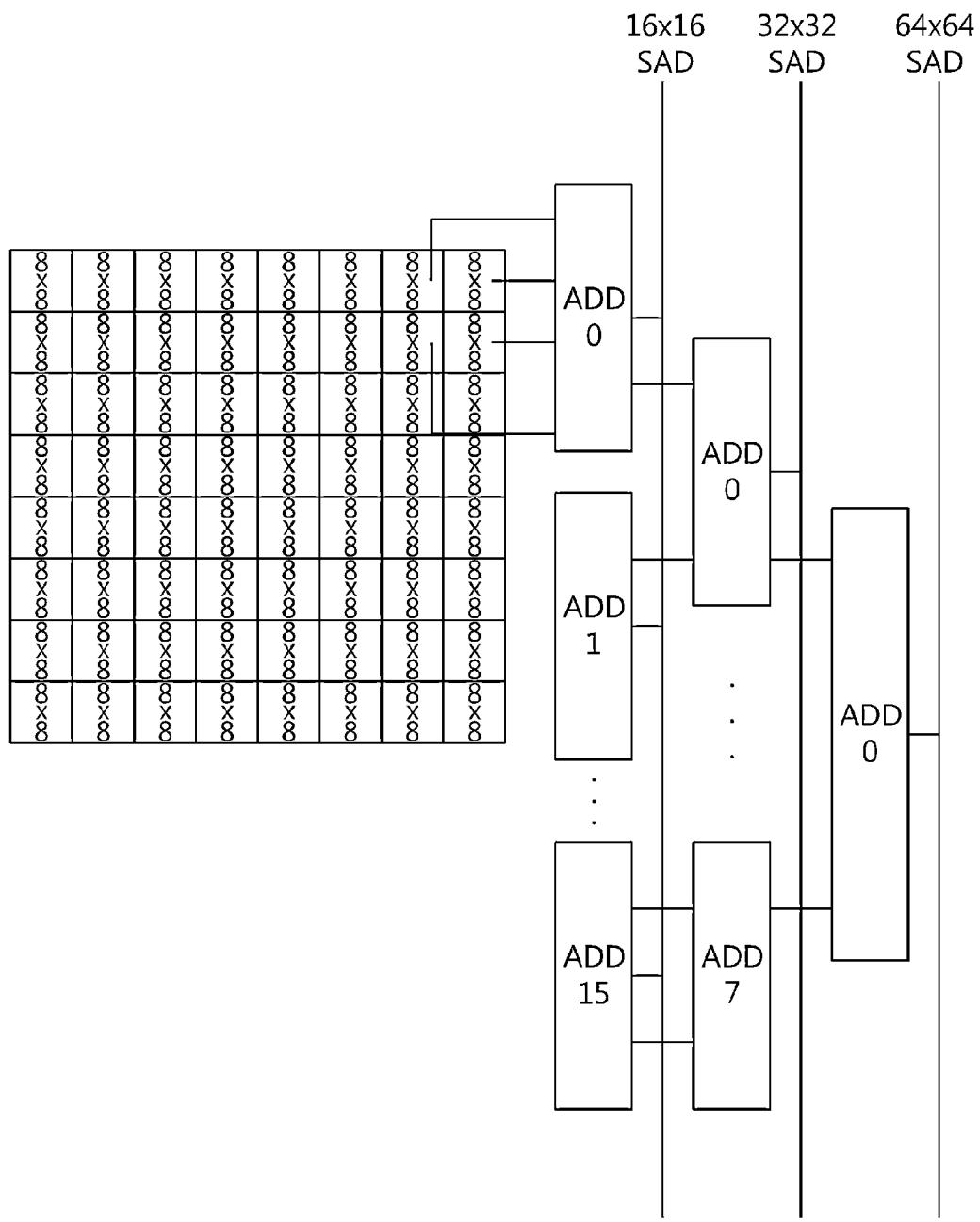
FIG. 7 is a block diagram of an example of the N×N sub-SAD calculator illustrated in FIG. 1.

FIG. 7 is a block diagram of an example of the N×N sub-SAD calculator illustrated in FIG. 1.

Referring to FIG. 7, it can be seen that the N×N sub-SAD calculator illustrated in FIG. 1 obtains the SAD for an 8×8 block, that is, a minimum module, and then performs operations for 16×16, 32×32 and 64×64 blocks by adding corresponding blocks.

Figure 8:
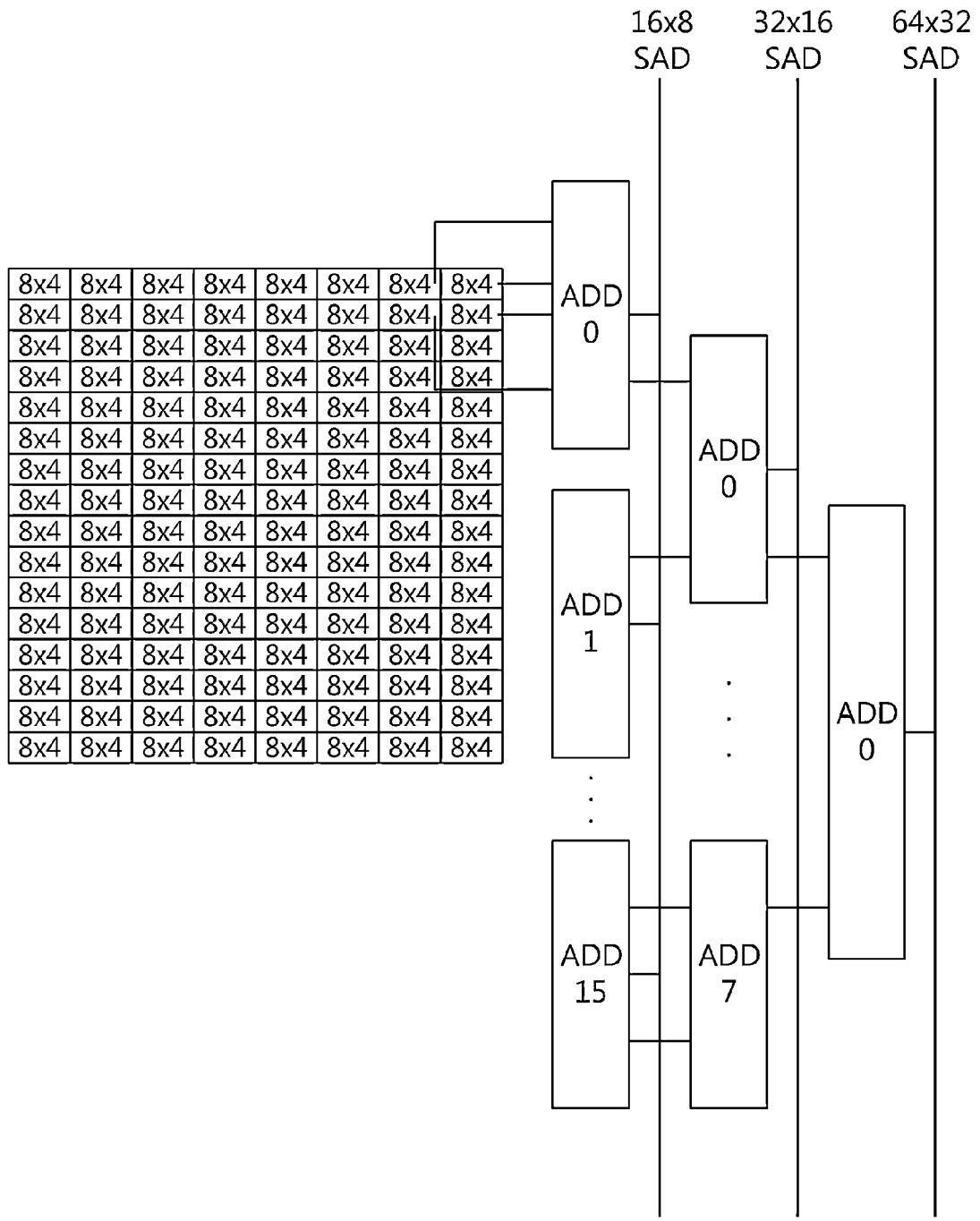
FIG. 8 is a block diagram of an example of the 2N×N sub-SAD calculator illustrated in FIG. 1.

FIG. 8 is a block diagram of an example of the 2N×N sub-SAD calculator illustrated in FIG. 1.

Referring to FIG. 8, it can be seen that the 2N×N sub-SAD calculator illustrated in FIG. 1 obtains the SAD for an 8×4 block, that is, a minimum module, and then performs operations for 16×8, 32×16 and 64×32 blocks by adding corresponding blocks.

Figure 9:
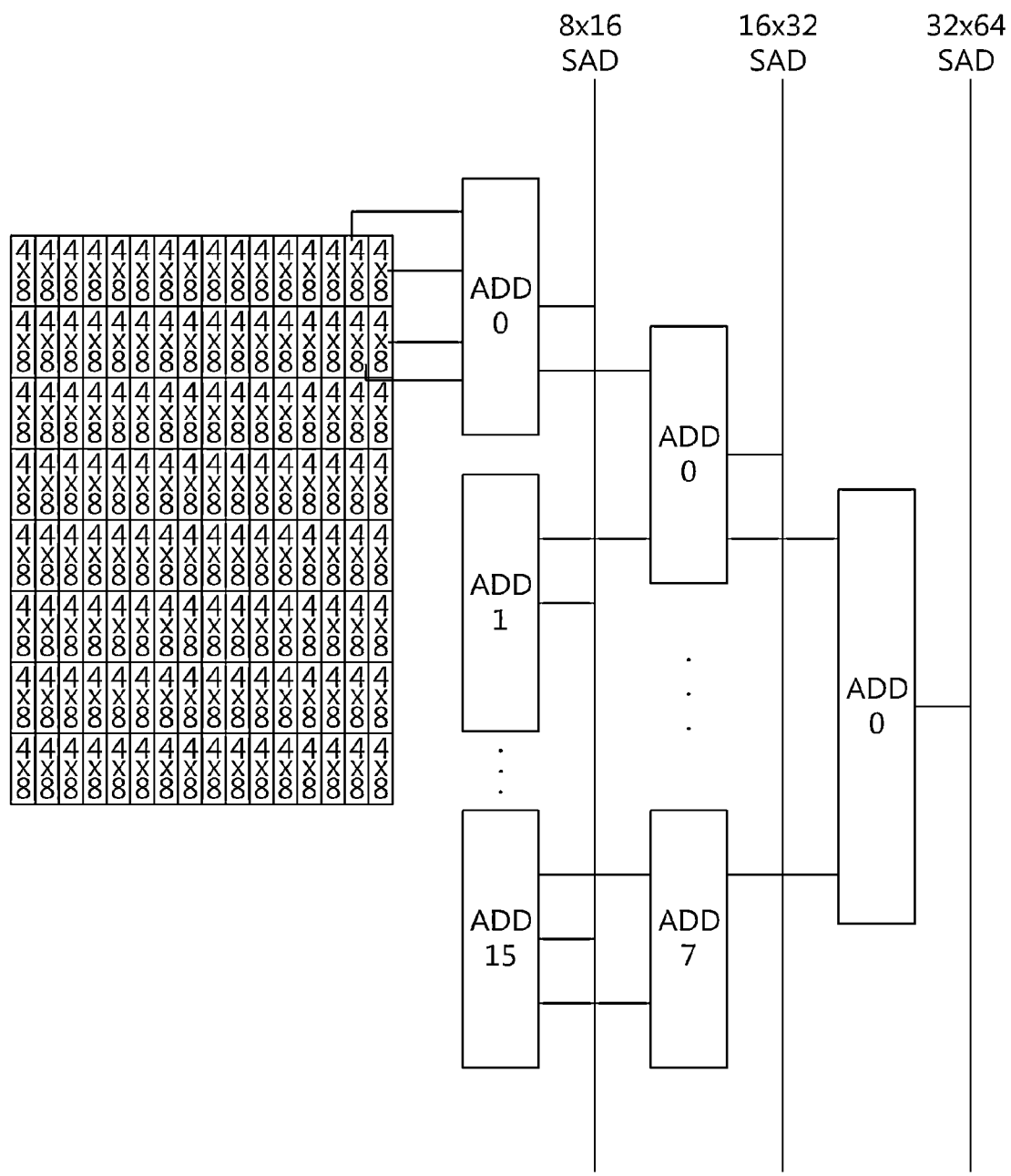
FIG. 9 is a block diagram of an example of the N×2N sub-SAD calculator illustrated in FIG. 1.

FIG. 9 is a block diagram of an example of the N×2N sub-SAD calculator illustrated in FIG. 1.

Referring to FIG. 9, it can be seen that the N×2N sub-SAD calculator illustrated in FIG. 1 obtains the SAD for a 4×8 block, that is, a minimum module, and then performs operations for 8×16, 16×32 and 32×64 locks by adding corresponding blocks.

As illustrated in FIGS. 7 to 9, the sub-SAD calculators of the present invention may be each configured to calculate various different SAD values via adders based on the basic SAD operation block.

Figure 10:
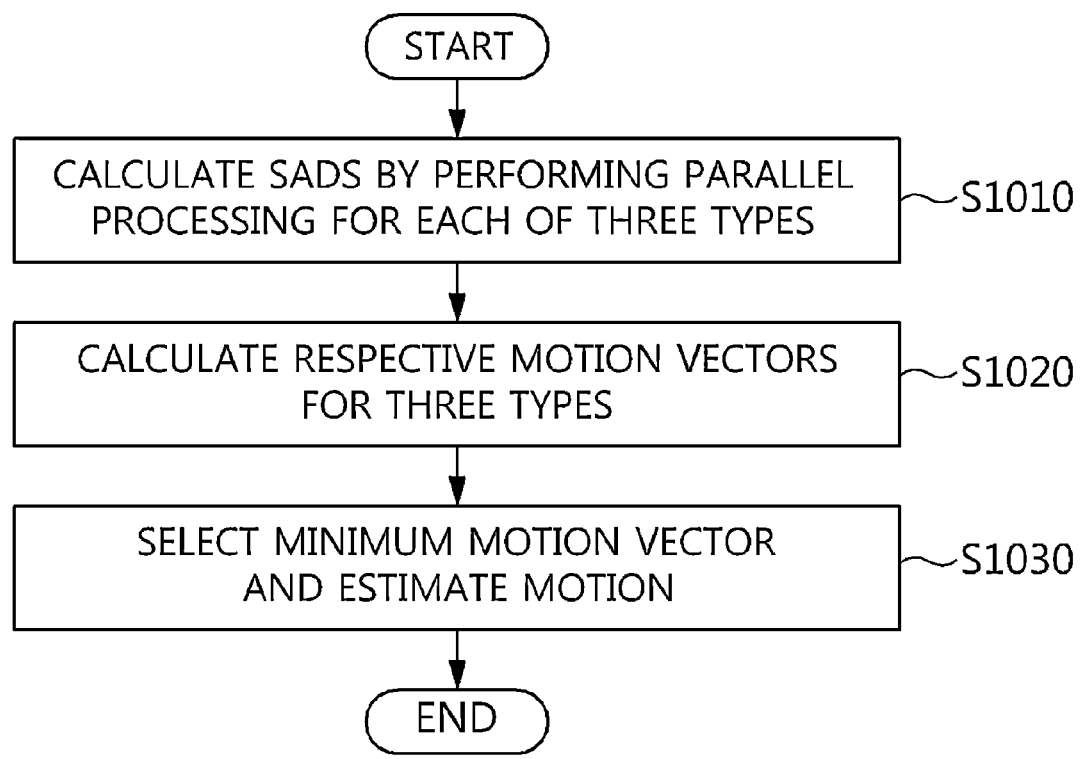
FIG. 10 is an operation flowchart illustrating a method of motion estimation for variable block sizes according to an embodiment of the present invention.

FIG. 10 is an operation flowchart illustrating a method of motion estimation for variable block sizes according to an embodiment of the present invention.

Referring to FIG. 10, in the motion estimation method according to this embodiment of the present invention, respective SAD values for three types of coding units are obtained by performing parallel processing for each of the three types of coding units at step S1010.

In this case, the three types of coding units may include N×N block-type coding units including 64×64, 32×32, 16×16 and 8×8 block size coding units, 2N×N block-type coding units including 64×32, 32×16, 16×8 and 8×4 block size coding units, and N×2N block-type coding units including 32×64, 16×32, 8×16 and 4×8 block size coding units. The motion estimation method may support 12 block sizes that are supported in the HEVC standard.

The processing of four block sizes corresponding to each type of coding units of the three types of coding units may be performed with hardware shared.

Step S1010 may be performed using PEs, each of which alternatively receives an odd current data input and an even current data input so that internal processing speed is twice data input speed.

Furthermore, in the motion estimation method according to this embodiment of the present invention, motion vectors for the three types of coding units are calculated using the SAD values at step S1020.

Furthermore, in the motion estimation method according to this embodiment of the present invention, a minimum motion vector is selected from among the motion vectors and motion estimation is performed at step S1030.

The apparatus and method for motion estimation for variable block sizes according to the present invention are not limited to the above-described configurations of the embodiments, but all or parts of the embodiments are selectively combined so that the present invention may be modified in various manners.

The present invention has the advantage of supporting all block sizes supported in the HEVC standard and performing parallel processing and hardware sharing for various block sizes.

Furthermore, the present invention has the advantage of implementing motion estimation for various block sizes using minimum hardware and efficiently performing motion estimation via N×N, 2N×N and N×2N parallel processing.

Moreover, the present invention has the advantage of alternatively receiving an odd current data input and an even current data input so that, upon motion estimation, internal processing speed is twice data input speed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A motion estimation apparatus, comprising:
circuitry configured to
perform parallel processing for each of three types of coding units via a processing element (PE) array unit;
calculate respective SAD values for the three types of coding units via a sub-SAD calculation unit;
calculate respective motion vectors for the three types of coding units via a motion vector calculation unit; and
select a minimum motion vector from among the motion vectors via a minimum motion vector selector,
wherein the three types of coding units comprise:
an N×N block type including 64×64, 32×32, 16×16, and 8×8 block sizes;
a 2N×N block type including 64×32, 32×16, 16×8, and 8×4 block sizes; and
an N×2N block type including 32×64, 16×32, 8×16, and 4×8 block sizes,
wherein the motion estimation apparatus supports 12 block sizes that are supported in an HEVC standard,
wherein processing of four block sizes corresponding to each of the three types of coding units is performed with hardware shared, and
wherein the PE array unit comprises an N×N array, a 2N×N PE array, and an N×2N PE array.

2. The motion estimation apparatus of claim 1, wherein the sub-SAD calculation unit comprises an N×N sub-SAD calculator, a 2N×N sub-SAD calculator, and an N×2N sub-SAD calculator.

3. The motion estimation apparatus of claim 2, wherein the N×N PE array, the 2N×N PE array and the N×2N PE array comprise 16 processing elements (PEs).

4. The motion estimation apparatus of claim 3, wherein the each of PEs alternatively receives an odd current data input and an even current data input so that internal processing speed is twice data input speed.

5. The motion estimation apparatus of claim 4, further comprising:
current image storage memory configured to store a current image;
previous image storage memory configured to store a previous image; and
an address generator configured to generate a memory address required for motion estimation in response to control of a control unit.

6. A motion estimation method, comprising:
calculating respective SAD values for three types of coding units by performing parallel processing for each of the three types of coding units;
calculating respective motion vectors for the three types of coding units; and
selecting a minimum motion vector from among the motion vectors,
wherein the three types of coding units comprise:
an N×N block type including 64×64, 32×32, 16×16, and 8×8 block sizes;
a 2N×N block type including 64×32, 32×16, 16×8, and 8×4 block sizes; and
an N×2N block type including 32×64, 16×32, 8×16, and 4×8 block sizes,
wherein the motion estimation method supports 12 block sizes that are supported in an HEVC standard,
wherein processing of four block sizes corresponding to each of the three types of coding units is performed with hardware shared, and
wherein calculating the SAD values is performed using PEs, each of which alternatively receives an odd current data input and an even current data input so that internal processing speed is twice data input speed.

* * * * *